United States Patent [19]

Stafford

[11] 4,356,928
[45] Nov. 2, 1982

[54] DECORATIVE ARTICLE CONTAINING FOWL

[76] Inventor: William Stafford, 101 Wheeler Dr., Hanhan, S.C. 29406

[21] Appl. No.: 275,719

[22] Filed: Jun. 22, 1981

[51] Int. Cl.³ .................... A01M 31/06; A63H 3/00
[52] U.S. Cl. ................................. 220/263; 43/3; 46/124; 206/457; 220/20.5; 220/336; 428/16; 428/35
[58] Field of Search ................ 43/2, 3; 46/124; 206/457; 220/20.5, 263, 336; 428/16, 35

[56] References Cited

U.S. PATENT DOCUMENTS

| 403,595 | 5/1889 | Jencks | 43/3 |
|---|---|---|---|
| 740,293 | 9/1903 | Loeble | 43/3 |
| 1,831,286 | 11/1931 | Chelini | 43/3 |
| 2,267,357 | 12/1941 | Soule | 43/3 |
| 2,274,246 | 2/1942 | Riddell | 43/3 |
| 2,413,418 | 12/1946 | Rulison | 43/3 |
| 2,480,390 | 8/1949 | Thompson | 43/3 |
| 2,691,233 | 10/1954 | Richardson | 43/3 |
| 2,747,314 | 5/1956 | McGregor | 43/3 |

Primary Examiner—Henry F. Epstein
Attorney, Agent, or Firm—Dority & Flint

[57] ABSTRACT

A decorative fowl provided for receiving articles is shaped to simulate an ornamental carved bird having an elongated body. A receptacle is provided in said elongated body having an opened top for receiving articles. A pair of wings is pivotally carried on the elongated body. A head simulating the head of a bird is rotatably carried adjacent a front top portion of the elongated body. Linkage means extend between the head and the pair of wings so that upon rotating the head from a first position to a second position, the wings are rotated from a position wherein they extend over the top of the receptacle providing a closure therefor to an opened outwardly extending diverging position providing access to the receptacle.

3 Claims, 6 Drawing Figures

DECORATIVE ARTICLE CONTAINING FOWL

BACKGROUND OF THE INVENTION

Heretofore, people placed their jewelry and other small valuable items that are often used in jewelry boxes and the like which are maintained in the home in a convenient location. One problem is that this is generally the first place a burglar looks when he enters the establishment looking for valuable items. Oftentimes, it is not practical in order to protect the valuable items to place them in bank vaults or safes because of the inconvenience of obtaining them when it is desired to use the items. Wall safes located in the homes in concealed places are not often used by the average person due to the cost of having one installed in the home.

Normally, a burglar upon entering a home, looks for valuables in the most obvious places since he desires to be in the home for the shortest possible time to avoid being caught.

Animated decoys which have movable wings and other components for use in duck hunting are disclosed in many patents. Examples of these decoys are disclosed in U.S. Pat. Nos. 1,831,286, 2,413,418, 2,480,390, 2,747,314 and 2,691,233. While these animated decoys which have movable wings and other type components have been utilized in hunting, carved fowl have not been used for providing an inconspicuous receiver for valuables.

SUMMARY OF THE INVENTION

This invention relates to a decorative fowl provided for receiving articles which is shaped to simulate an ornamental carved bird. In one particular embodiment, the fowl is a carved magnum drake and includes an elongated body which has a receptacle provided therein with an open top. A pair of wings are pivotably carried on the elongated body and a head simulating the head of a duck or drake is rotatably carried adjacent the front portion of the elongated body.

Linkage means extends between the head and pair of wings so that upon rotating the head approximately 90 degrees, the wings are rotated from a position wherein they extend over the top of the receptacle providing a closure therefor to an open outwardly extending diverging position providing access to the receptacle. Accordingly, when the wings are in the retracted position, any articles placed in the receptacle are completely sealed, and the fowl looks like a conventional carved duck. This duck can be placed in any suitable place within the home or office to display its beauty while being a very unlikely object that would be investigated by a burglar or thief.

Accordingly, it is an important object of the present invention to provide a decorative fowl which can be displayed as a work of art while providing an inconspicuous and convenient place for storing articles such as jewelry and the like.

Another important object of the present invention is to provide a decorative fowl that can be utilized for storing items wherein a concealed compartment can be readily opened and closed.

The construction designed to carry out the invention will be hereinafter described, together with other features thereof.

The invention will be more readily understood from a reading of the following specification and by reference to the accompanying drawings forming a part thereof, wherein an an example of the invention is shown and wherein:

DESCRIPTION OF A PREFERRED EMBODIMENT

Figure 1:
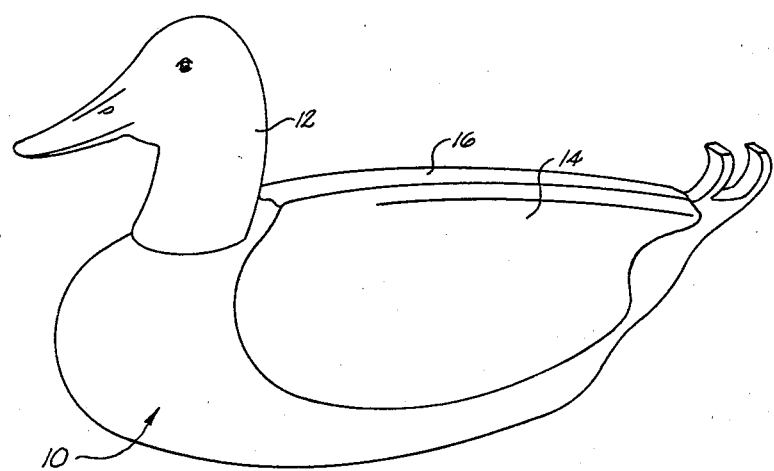
FIG. 1 is a perspective view illustrating an ornamental and decorative bird constructed in accordance with the present invention.

Referring to FIG. 1 of the drawings, there is illustrated a magnum drake which has an elongated body 10 which may be constructed of any suitable material such as carved wood. Extending upwardly and adjacent the front of the body is a head 12. A pair of spaced wings 14 and 16 extend over the top portion of the body. A receptacle 18, which is substantially rectangular shaped, is provided in the elongated body 10 and has an opened top positioned directly beneath the wings 14 and 16. A ledge 20 spans across a front portion of the receptacle 18.

The head 12 is provided for rotating relative to the elongated body 10 by being supported on a cylindrical dowel 22. The upper portion of the dowel 22 is secured within the neck portion of the head and the lower portion of the dowel 22 extends through a bore provided in the ledge 20 and terminates in the receptacle 18. A pair of arms 24 and 26 are pivotably carried on the dowel 22, and nylon bearings 28 are positioned on the dowel so as to permit the arms to rotate freely on the dowel relative to other components described below. It is noted that both of the arms 24 and 26 have cylindrical spaced portions adjacent inner ends through which the dowel 22 extends. It is also noted that the inner portion of the arm 26 dog-legs downwardly so as to be spaced below the arm 24 on the dowel 22 while allowing the outer ends of the arms to be at the same level.

Figure 5:
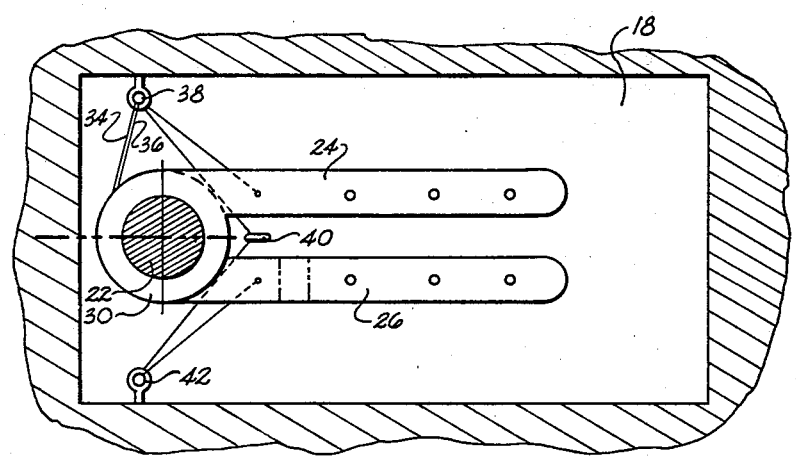
FIG. 5 is a sectional plan view showing the mechanism of FIG. 4.
Figure 6:
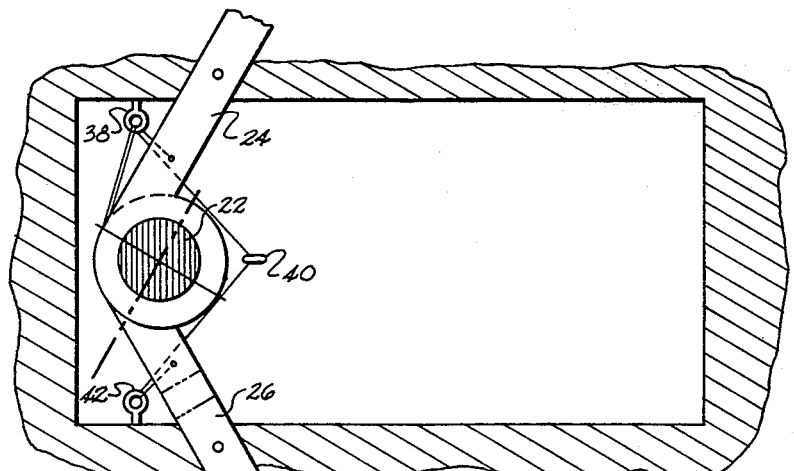
FIG. 6 is a sectional plan view showing the mechanism of FIG. 5 when the arms which are used for manipulating the wings are in open position.

The arms 24, 26 and the bearings 28 are secured on the dowel by means of a spool 30 that is fixed to the lower portion of the dowel 22 by means of a small dowel pin 32. A linkage means extends from the spool 30 and is connected to the arms 24 and 26 so that upon rotating of the head of the duck and the dowel 22 ninety degrees, the arms are spred from a closed position such as shown in FIG. 5 to an open position such as shown in FIG. 6.

The linkage means includes a pair of lines 34 and 36 which have one end anchored to the spool 30. The lines extend from the spool 30 through an eyelet 38 provided in a side wall of the receptacle 18. Line 34 then is secured by tying or any other suitable means to the arm 24. Line 36 extends through the eyelet 38 and through another eyelet 40 extending upwardly from the base of the receptacle 18 to still another eyelet 42 secured in the opposite wall of the receptable 18 and is then tied to the arm 26. As a result of the lines 34 and 36 being strung in this manner, when the spool 30 is rotated ninety degrees, the arms are pivoted from the closed position shown in FIG. 5 to the open position shown in FIG. 6.

Figure 2:
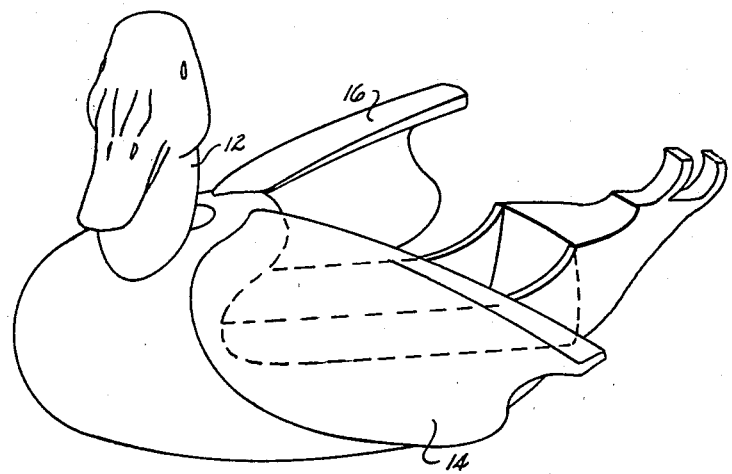
FIG. 2 is a perspective view illustrating the bird of FIG. 1 with his wings opened providing access to a receptacle provided therein.
Figure 3:
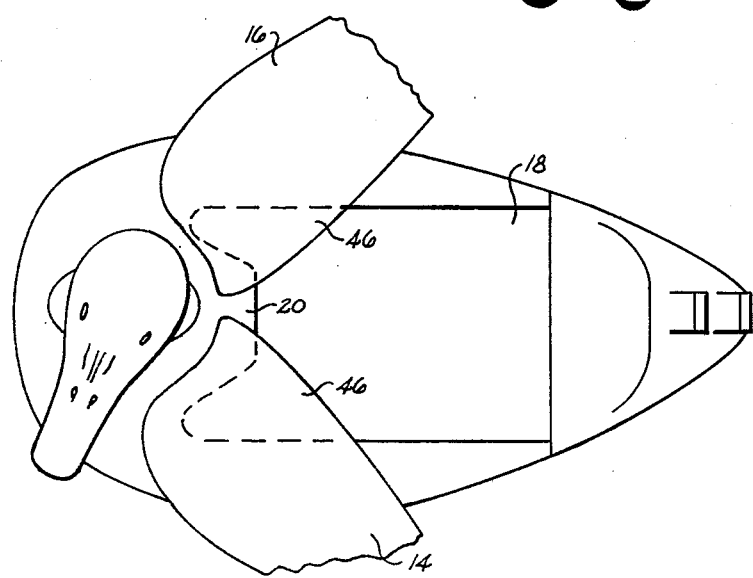
FIG. 3 is a top plan view of the bird shown in FIG. 2.
Figure 4:
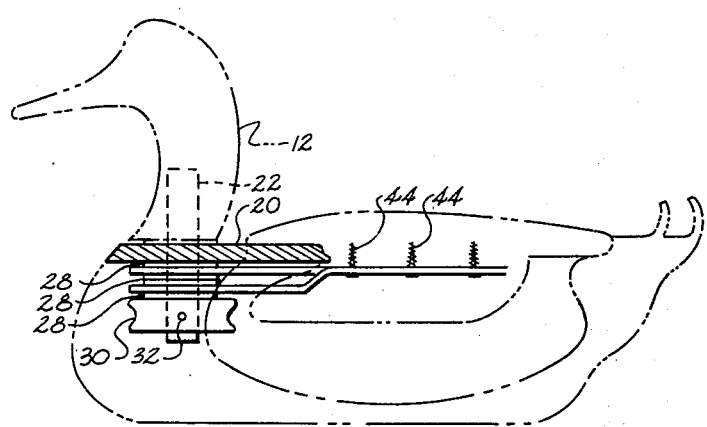
FIG. 4 is a side elevational view partially in section illustrating the mechanism for opening and closing the wings of the fowl.

The wings 14 and 16 are secured to the respective arms 26 and 24 by means of screws 44. It is noted that the front portion of the wings extend over the ledge 20 and the inner edges 46 of the wings are substantially straight so that when the wings are in the closed position as shown in FIG. 1, the receptacle 18 is completely closed. Since the wings are directly fixed to the arms 24 and 26, when the arms are moved from the closed position such as shown in FIG. 5 to the open position shown in FIG. 6, the wings move from the closed position shown in FIG. 1 to the open position shown in FIGS. 2 and 3.

The magnum drake is preferably carved of wood so as to simulate a handcrafted work of art. Of course, while a magnum drake is shown in the drawings, it is to be understood that any suitable type of bird or fowl could be constructed in the same manner as the particular duck shown.

While a preferred embodiment of the invention has been described using specific terms, such description is for illustrative purposes only, and it is to be understood that changes and variations may be made without departing from the spirit or scope of the following claims.

What is claimed is:

1. A decorative fowl provided for receiving articles shaped to simulate an ornamental carved bird comprising:

an elongated body;

a receptacle provided in said elongated body having an opened top for receiving articles;

a pair of wings pivotally carried on said elongated body;

a head simulating the head of a bird rotatably carried adjacent a front top portion of said elongated body;

linkage means extending between said head and said pair of wings so that upon rotating said head from a first position to a second position, said wings are rotated in opposite directions from a position wherein they extend over the top of said receptacle providing a closure therefor to an opened outwardly extending diverging position providing access to said receptacle.

2. The decorative bird as set forth in claim 1 further comprising:

a ledge scanning across a front portion of said receptacle;

a vertically extending bore provided in said ledge;

a dowel projecting out of a base portion of said head and extending through said bore;

a spool fixed to a lower portion of said dowel; and said linkage means including, (i) a pair of arms pivotally carried on said dowel, each being fixed to a respective wing;

(ii) lines extending from said spool to said pair of arms causing said arms to be rotated from a closed position to a diverging outwardly extending position responsive to rotating said head.

3. The decorative fowl as set forth in claim 2 further comprising:

bearings surfaces carried on said dowel between said pair of arms permitting said arms to rotate on said dowel.

* * * * *